United States Patent Office 3,647,772
Patented Mar. 7, 1972

3,647,772
PROCESS FOR POLYMERIZING OR COPOLYMERIZING OLEFINS WITH CARRIER-SUPPORTED CATALYST
Norio Kashiwa, Otake-shi, Japan, assignor to Mitsui Petrochemical Industries, Ltd., Chiyoda-ku, Tokyo, Japan
No Drawing. Filed Dec. 12, 1969, Ser. No. 884,738
Claims priority, application Japan, Dec. 19, 1968, 43/92,635
Int. Cl. C08f 1/56, 3/02
U.S. Cl. 260—88.2                                        9 Claims

ABSTRACT OF THE DISCLOSURE

A process for polymerizing or copolymerizing olefins in the presence of a catalyst consisting of
(a) a transition metal component chemically bound and supported on the surface of in organic solid particles, obtained by treating solid particles of magnesium carbonate with an electron donor which is liquid or gaseous under the treating conditions, the amount of said electron donor being preferably at least 0.01 mmol per gram of solid particles of magnesium carbonate, and a transition metal compound which is selected from the group consisting of halogen compounds of titanium and vanadium, the amount of said transition metal compound being preferably such that the supported amount of said compound is 0.1-3 mmols per gram of said solid particles of magnesium carbonate; and,
(b) an organo-metallic compound, preferably in an amount of 0.01-50 mmols per liter of a polymerization solvent.

---

This invention relates to an improved process for polymerizing olefins in the presence of a catalyst, one component of which is a transition metal compound of a Ziegler-type catalyst chemically bound (to be called supported hereinafter) onto inorganic solid particles. According to the process of the invention, the yield of polymer per unit weight of the solid particles of the catalyst is remarkably improved, thus making it possible to reduce the amount of inorganic solid particle carrier which remains in the resultant polymer thereby producing a product with decreased ash content, increase the apparent density of the resulting polymer, and also easily control the melt index of the polymer.

More particularly, the invention relates to a process for polymerizing or copolymerizing olefins in the presence of a catalyst comprising a transition metal component of the Ziegler-type catalyst chemically bound and supported on inorganic solid particles, wherein the polymerization or copolymerization of olefins is carried out in the presence of a catalyst consisting of (a) A transition metal component chemically bound and supported on the surface of inorganic solid particles, obtained by treating solid particles of magnesium carbonate with an electron donor selected from the group consisting of aliphatic carboxylic acids, aromatic carboxylic acids, alkyl esters of aliphatic carboxylic acids, alkyl esters of aromatic carboxylic acids, aliphatic ethers, cyclic ethers, aliphatic ketones, aromatic ketones, aliphatic aldehydes, aliphatic alcohols, aromatic alcohols, aliphatic acid amides, aliphatic nitriles, aromatic nitriles, aliphatic amines, aromatic amines, aliphatic phosphines and aromatic phosphines which is liquid or gaseous under the treating conditions, the amount of such electron donor being preferably at least 0.01 mmol per gram of the solid particles of magnesium carbonate, and a transition metal compound which is selected from the group consisting of halogen compounds of titanium and vanadium, the amount of such transition metal compound being preferably such that the supported amount of such compound is 0.1-3 mmols per gram of the solid particles of magnesium carbonate; and, (b) An organo-metallic compound selected from the group consisting of organo-aluminum compounds and alkyl zinc, preferably in an amount of 0.01-50 mmols per liter of a polymerization solvent.

Catalysts for polymerization of olefins consisting of transition metal compounds and organo-metallic compounds generally tend to be agglomerated owing to the reaction between these catalyst components; as a result, only the surface of the agglomerated mass acts as catalyst and the transition metal compound inside the mass is consumed uselessly. Various proposals, therefore, have been made to prevent the agglomeration of the catalyst components by supporting them on carriers and use the catalysts effectively.

As one of such proposals, U.S. Pat. No. 3,166,542 discloses the use of Ziegler-type catalysts chemically bound to the surface of a finely-divided inorganic solid having an average particle diameter of less than about 0.1 micron, and especially recommends the use of solid particles of metal oxides such as titania, silica and alumina.

British patent specification No. 1,024,336 proposes the use of the hydroxychloride of a bivalent metal as such solid particle, and describes that magnesium, calcium, cadmium, zinc and ferrous iron are especially recommended, and calcium hydroxide is entirely inactive in the polymerization of propylene.

In British patent specifications Nos. 841,822 and 851,111, transition metal catalyst components are merely deposited on the surface of carriers without being chemically bound, and silicon carbide, calcium phosphate, magnesium carbonate, and sodium carbonate are exemplified.

Belgian Pat. No. 705,220 proposes the use of oxygen compounds of bivalent metals as the solid carrier. In this proposal, the catalyst components are chemically bound onto the surface of the carrier, and inorganic acid salts and organic acid salts of magnesium are illustrated as the carrier, with no reference being made to magnesium carbonate.

In all of these prior proposals, the yield of polymer per unit weight of the carrier used is small, although differing depending on such factors as the solid carriers used and whether the catalyst components are merely deposited on the carriers or chemically bound to them. (The term "yield per unit weight of the carrier," if expressed precisely, means a yield per unit weight of the carrier and a transition metal component supported thereon, but since the amount of the transition metal compound is negligibly small as compared with the weight of the carrier, the term "yield of polymer per unit weight of the carrier" is used in the present specification for the sake of convenience.) Hence, larger amounts of the carrier need be used, and an ash content attributable to the carrier remaining in the resulting polymer increases, giving an adverse effect to the properties of the resulting polymer. It is likely that shaped articles made from the polymer will undergo fish eye defects, opacification, coloration or underisable interaction with an additive contained there (such as stabilizers, mold-releasing agents, and coloring agents), and these defects constitute appreciable restrictions on the utilization of the polymer. For instance, magnesium hydroxychloride is difficult to prepare with high reproducibility. When it is used as the carrier, the chlorine contained therein, if remaining in the polymer, adversely affects its physical properties. This involves the necessity of removing the residual catalyst and carrier from the polymer. The removal, however, cannot be effected with ease because magnesium hydroxychloride is not soluble in water or methanol.

It has now been found that a carrier-supported catalyst comprising Ziegler-type catalyst component supported on inorganic solid particles in the presence of an electron donor which is liquid or gaseous under the treatment conditions can lead to an increase in the yield of polymer per unit weight of the carrier and eliminate the defects caused by the carrier. The effect of the electron-donor is especially remarkable when magnesium carbonate is used as the carrier. It has been found that an electron donor produces no appreciable effect when a halogen compound of a transition metal is supported in its presence on inorganic solid particles such as solid particles of oxides, for example, calcium oxide, magnesia and silica, inorganic acid salts, for instance, magnesium sulfate, and organic acid salts, for instance, magnesium acetate, which have heretofore been considered effective as carriers for Ziegler-type catalyst components. It has also been found that the presence of an electron donor is effective with magnesium carbonate while it is not with calcium carbonate.

Since basic magnesium carbonate brings about a result equivalent to magnesium carbonate, the term "magnesium carbonate" includes basic magnesium carbonate.

When a halogen compound of a transition metal or its complex salt is merely deposited or absorbed or magnesium carbonate, the presence of an electron donor is not effective at all. It is only when the transition metal halogen compound is chemically fixed or supported onto magnesium carbonate by a chemical reaction that the effect of the electron donor is observed. This can be conjectured from the following. For instance, when magnesium carbonate is reacted with titanium tetrachloride, the resulting catalyst has an exceedingly high polymerization activity if the molar ratio of chlorine to titanium on the carrier is over 4, preferably over 5. The catalyst activity is very low, however, if the molar ratio of chlorine to titanium on the carrier is below 4. However, it is completely unknown why the presence of an electron donor proves effective only when magnesium carbonate is used as carrier, and when a transition metal compound is chemically fixed onto the carrier.

Accordingly, an object of the present invention is to provide a process for producing polyolefins using Ziegler-type catalyst components supported on solid particles of magnesium carbonate, whereby the yield of polymer per unit weight of the catalyst component supported on the carrier is remarkably improved and an ash content of the polymer attributable to the carrier present in the polymer can be reduced.

Many other objects and advantages of the present invention will become clearer from the following description.

Magnesium carbonate employed in the invention as the catalyst carrier is commercially available. It can also be obtained by heating magnesium carbonate containing water of crystallization to 100 to 350° C. or heating it at reduced pressure. Basic magnesium carbonate can be used likewise. The average particle diameter of solid particles of magnesium carbonate used in the invention ranges from about 0.05 to 70μ, for instance. Recommendable is the use of solid particles of magnesium carbonate, 80% by weight of which consists of particles having an average diameter of more than 0.1μ but not exceeding 30μ, preferably 0.5–20μ.

For supporting a transition metal halogen compound on magnesium carbonate, various conventional procedures can be used which effect an intimate contact between magnesium carbonate or further the transition metal halogen compound and a electron donor which is liquid or gaseous under the treating conditions. For instance, magnesium carbonate is pre-treated with an electron donor, and then treated with a transition metal halogen compound. Or solid particles of magnesium carbonate are treated in the presence of an electron donor and a transition metal halogen compound. This can be accomplished by reacting a mixture of the electron donor and the transition metal halogen compound with magnesium carbonate, or by reacting the magnesium carbonate, transition metal halogen compound and electron donor. Most preferably used is a procedure comprising pre-treating magnesium with an electron donor, and then treating this carrier with a transition metal halogen compound. Additionally the treatment of the pre-treated carrier with the transition metal compound is effected in the absence of organic liquid solvent.

For treating magnesium carbonate with an electron donor, any procedure can be used which effects an intimate contact of magnesium carbonate with the electron donor which is liquid or gaseous under the treating conditions. For instance, electron donors which are gaseous or liquid under the treatment conditions are directly contacted with solid particles of magnesium carbonate or with such solid particles suspended in an organic liquid medium inert to the Ziegler catalyst, such as hexane, benzene and kerosene. Electron donors which are solid under the treatment conditions can be contacted with solid particles of magnesium carbonate after having been dissolved in an organic liquid medium inert to the Ziegler-type catalyst. The treating temperature is below the heat decomposition temperature of the solid particles of magnesium carbonate, and usually ranges from room temperature to about 300° C. The treating time may be such as to ensure a sufficient contact between the electron donor and the solid particles of magnesium carbonate, and no particular restriction is imposed in this respect. Usually, it is above 5 minutes, although varying depending upon the contact means and the electron donors used. A long time contact may be made, though unnecessary. For instance, the treating time is from 5 minutes to 5 hours.

With an increase in an amount of the electron donor per unit weight of the carrier, the apparent density, melt index and yield per unit weight of the carrier-supported catalyst component, of the resulting polymer tend to increase. On the other hand, the yield of polymer per unit weight of vanadium or titanium tends to decrease after it has once risen. It is desirable therefore to control the amount of the electron donor used in the present invention in preparing the carrier-supported catalyst component of the present invention. The control should be made in consideration of the foregoing and other factors. Preferably, the amount of the electron donor is 0.01 mmol or more per gram of magnesium carbonate. With in this range, there is an appreciable effect of the presence of the electron donor, and the yields of polymer per unit weight of the carrier-supported catalyst component and per unit weight of titanium or vanadium are on the increase. Amounts below 0.05 mmol cause a decrease in the apparent density and melt index of the polymer. If the amount is less than 0.1 mmol, there is a tendency that the melt index of the obtained polymer is too low. Especially preferably, therefore the electron donor should be used in an amount above 0.1 mmol. Amounts above 5 mmols tend to cause a remarkable increase in the yield of polymer per unit weight of the carrier-supported catalyst component but a decrease in the yield of polymer per unit weight of titanium or vanadium. It is preferable therefore that the amount of the electron donor should not exceed 5 mmols. Best results are obtained with respect to the apparent density and melt index of the resulting polymer and the yields of the polymer per unit weight of the carrier-supported catalyst component and per unit weight of titanium or vanadium, when 0.1 to 5 mmols, per gram of magnesium carbonate, of an electron donor is used.

The particles of magnesium carbonate pre-treated with the electron donor are then heated together with the transition metal halogen compound which is liquid under the treating conditions, or solid particles of magnesium carbonate are heated with the pre-treated transition metal halogen compound, thereby supporting the transition metal halogen compound onto the surface of the magnesium carbonate solid particles. According to the process of the present invention, the polymerization of olefins is carried out using a catalyst consisting of such catalyst component with a supported transition metal halogen compound and another component selected from the group consisting of organo-aluminum compounds and alkyl zinc.

The supporting of the transition metal halogen compound can be effected in the same manner as in the conventional proposals. For instance, the pretreated solid particles of magnesium carbonate are heated together with a transition metal halogen compound which is liquid under the treating conditions. Generally, it is advisable to effect the heating for 10 minutes to 5 hours at room temperature to 300° C., preferably 30 to 200° C., more preferably 40 to 150° C. This treatment should of course be carried out in an inert gaseous atmosphere free from oxygen and water. After this treatment, unreacted transition metal halogen compound is removed by filtration or decantation, preferably followed by washing with a fresh charge of transition metal halogen compound. Subsequently, washing with a suitable inert solvent such as hexane, heptane and kerosene is effected to remove free transition metal halogen compound not supported on the metal halide as much as possible. When the resulting transition metal halogen compound supported on magnesium carbonate is used as a component of the catalyst to be employed in the present invention, it is used in the form of a suspension in an inert solvent or a solid powder obtained by the washing liquid in a dry inert gaseous stream or under reduced pressure.

The amount of the transition metal halogen compound to be supported on the pre-treated solid particles of magnesium carbonate can be varied within the range of 0.1 mmol to 3 mmols per gram of the magnesium carbonate.

The foregoing procedure can be practiced in a similar manner when a mixture of an electron donor and a transition metal halogen compound is reacted with the solid partcles of magnesium carbonate, and when a mixture of the electron donor, transition metal halogen compound and the solid particles of magnesium carbonate is reacted at the same time. If the electron donor is a compound having at least one free hydroxyl group, for instance, an alcohol or a carboxylic acid, it is preferable to treat solid particles of magnesium carbonate first with the electron donor and then with a transition metal halogen compound.

The electron donor used in the invention is liquid or gaseous under the treating conditions (including cases where it is capable of becoming liquid or gaseous under the treating conditions), and is selected from the group consisting of aliphatic carboxylic acids, aromatic carboxylic acids, alkyl esters of aliphatic carboxylic acids, alkyl esters of aromatic carboxylic acids, aliphatic ethers, cyclic ethers, aliphatic ketones, aromatic ketones, aliphatic aldehydes, aliphatic alcohols, aromatic alcohols, aliphatic acid amides, aliphatic nitriles, aromatic nitriles, aliphatic amines, aromatic amines, aliphatic phosphines and aromatic phosphines. Preferred electron donors to be used in the present invention are selected from the group consisting of aliphatic carboxylic acids having 1 to 12 carbon atoms, aromatic carboxylic acids having 7 to 12 carbon atoms, esters of aliphatic carboxylic acids having 1 to 12 carbon atoms and saturated or unsaturated aliphatic alcohols having 1 to 12 carbon atoms, esters of aromatic carboxylic acids having 7 to 12 carbon atoms and aliphatic alcohols having 1 to 12 carbon atoms, aliphatic ethers having 2 to 12 carbon atoms, cyclic ethers having 3 to 4 carbon atoms, aliphatic ketones having 3 to 13 carbon atoms, aliphatic aldehydes having 1 to 12 carbon atoms, aliphatic alcohols having 1 to 12 carbon atoms, aliphatic acid amides having 1 to 12 carbon atoms, aliphatic nitriles having 2 to 12 carbon atoms, aromatic nitriles having 7 to 12 carbon atoms, aliphatic amines having 1 to 12 carbon atoms, aromatic amines having 6 to 10 carbon atoms, aliphatic phosphines having 3 to 18 carbon atoms and aromatic phosphines having 6 to 21 carbon atoms. The alcohols, carboxylic acids and esters are particularly preferred electron donors. Specific examples of these electron donors are aliphatic carboxylic acids such as acetic acid, propionic acid, valeric acid and acrylic acid; aromatic carboxylic acids such as benzoic acid and phthalic acid; aliphatic carboxylic acid esters such as methyl formate, dodecyl formate, ethyl acetate, butyl acetate, vinyl acetate, methyl acrylate, octyl lactoate, ethyl laurate and octyl laurate; aromatic carboxylic acid esters such as methyl benzoate, ethyl benzoate, octyl paraoxybenzoate and dioctyl phthalate; aliphatic ethers such as ethyl ether, butyl ether, hexyl ether, allylbutyl ether, isopropyl ether, and methyl undecyl ether; cyclic ethers such as tetrahydrofuran, dioxane and trioxane; aliphatic amines such as methyl amine, diethyl amine tributyl amine, octyl amine, allyl amine, and dodecyl amine; aromatic amines such as pyridine, aniline and naphthyl amine; aliphatic ketones such as acetone, methyl ethyl ketone, methyl isobutyl ketone, ethyl butyl ketone and dihexyl ketone; aromatic ketones such as acetophenone; aliphatic aldehydes such as propionaldehyde and isobutylaldehyde; aliphatic alcohols such as methanol, ethanol, isopropanol, hexanol, 2-ethyl hexanol, octanol and dodecanol; aromatic alcohols such as benzyl alcohol and methyl benzyl alcohol; aliphatic nitriles such as acetonitrile, valeronitrile and acrylonitriles; aromatic nitrile such as benzonitrile and phthalonitrile; aliphatic acid amides such as acetamide; and phosphines such as trimethyl phosphine, triethyl phosphine and triphenyl phosphine.

The transition metal halogen compounds and organo-aluminum or organo-zinc compounds used as the catalyst components in the invention are well known as components of Ziegler-type catalysts.

In the present invention, halogen compounds of titanium or vanadium which are liquid under the treating conditions are used. Specific examples of these halogen compounds are halogen compounds of tetravalent titanium, such as titanium tetrachloride, titanium ethoxytrichloride, titanium diethoxydichloride and titanium dibutoxydichloride, halogen compounds of tetravalent vanadium, such as vanadium tetrachloride, and halogen compounds of pentavalent vanadium such as vanadium oxytrichloride, especially preferred being tetravalent titanium compounds, especially titanium tetrachloride.

The organo-metallic compounds which exhibit activity in the polymerization of olefins when used in combination with the transition metal halogen compounds supported on magnesium carbonate are expressed by the general formulae $R_3Al$, $R_2AlX$, $RAlX_2$, $R_2AlOR$, $RAl(OR)X$ and $R_3Al_2X_3$ (wherein R is an alkyl or aryl group, and X is a halogen atom) and organo-zinc compounds expressed by the general formula $R_2Zn$ (wherein R is an alkyl group).

Specific examples of the preferable organometallic compounds are triethyl aluminium, tripropyl aluminium, tributyl aluminum, diethylaluminum chloride, diethylaluminum bromide, diethylaluminum ethoxide, diethylaluminum phenoxide, ethylaluminum ethoxychloride, ethylaluminum sesquichloride, diethyl zinc and dibutyl zinc.

The concentration of the supported transition metal halogen compound used in the polymerization of olefins in the invention is preferably within the range of 0.005 to 10 g. per liter of solvent, and the concentration of the organo-metallic compound is preferably 0.01 to 50 mmols.

Incidentally, a combination of the organo-aluminium compound or alkyl zinc with magnesium carbonate pretreated or not pre-treated and a combination of the transition metal halogen compound with magnesium carbonate pre-treated or not pre-treated do not exhibit any appreciable polymerization activity towards olefins.

The polymerization reaction of olefins using the catalyst of the invention is carried out in the same manner as in the known polymerization reactions using the ordinary Ziegler-type catalyst.

These operations need to be performed in a substantially oxygen- and water-free condition. A suitable inert solvent such as hexane, heptane and kerosene is used. The catalyst of the invention is put into the solvent, and an olefin is fed thereinto to effect its polymerization. The polymerization temperature is 20 to 200° C., preferably 60 to 180° C., and the polymerization is preferably carried out under elevated pressure. The pressure ranges from atmospheric pressure to 60 kg./cm.$^2$, especially from 2 to 60 kg./cm.$^2$. In the polymerization of the olefin with the catalyst system of the invention, the molecular weight of the polymer can be controlled to some extent by varying the polymerization conditions, such as the polymerization temperature and the molar ratio between the catalyst components. The addition of hydrogen to the polymerization system is effective for control the molecular weight.

The process of the present invention is applicable to all olefins which can be polymerized with ordinary Ziegler-type catalysts, but preferably to the polymerization of propylene and ethylene and the copolymerization of ethylene with propylene, ethylene with 1-butene, and propylene with 1-butene.

The advantages of the catalyst according to the present invention are that it gives a far higher yield of a polyolefin per unit weight of the transition metal than in the case of using a catalyst system not supported on the carrier used in the invention, and also gives a polymer having a far higher apparent density. For this reason, the yield of polymer per unit volume of solvent used increases and the discharge and transportation of the polymer becomes easier. Furthermore, when compared with the use of a catalyst component consisting of a transition metal halogen compound supported on inorganic solid particles in the absence of an electron donor, the catalyst of the present invention gives a higher yield of polymer per unit weight of the carrier and gives a polymer having a far higher apparent density and melt index. Since, therefore, the resulting polymer contains the transition metal halogen compound and carrier in very small amounts, shaped articles obtained from the polymer hardly change in quality without particularly inactivating or removing these matters. Thus, the polyolefins obtained according to the process of the invention are available for ordinary applications with satisfactory results.

The following examples show the embodiments of the present invention.

Example 1

Anhydrous magnesium carbonate having an average particle diameter of $10\mu$ and a specific surface area of 33 m.$^2$/g. was dried for one hour at 150° C. Ten grams of the dried magnesium carbonate were suspended into 50 cc. of refined hexane. With the addition of 5 mmols of n-octanol, the mixture was stirred for 30 minutes at 50° C., and then hexane was removed in vacuo. Titanium tetrachloride (150 cc.) was added, and the entire system was heated to 130° C. under stirring, and maintained at this temperature for 40 minutes. While the system was still hot after the end of reaction, the solid part was separated by filtration, and washed with refined hexane until no chlorine was detected in the filtrate. The separated solid part was dried, and analyzed. As a result, it was found that titanium-chlorine compound equivalent to 16 mg. of titanium and 126 mg. of chlorine per gram of the carrier was supported. This means that the molar ratio of chlorine to titanium (Cl/Ti) on the carrier was 11. The resulting titanium-chlorium-chlorine compound supported on magnesium carbonate was referred to as catalyst component (A).

A 2-liter autoclave was charged with one liter of refined kerosene, and after purging the autoclave with nitrogen, 3 mmols of triethyl aluminum and 150 mg. of the aforesaid catalyst component (A) were added. The entire system was heated to a temperature of 90° C. Hydrogen (3.5 kg./cm.$^2$) was introduced, and ethylene was continuously added so that the total pressure of the reaction system reached 7 kg./cm.$^2$. The polymerization of ethylene was performed for 2 hours. At the end of the polymerization, the solvent was separated, and without inactivating the catalyst with methanol, the product was immediately dried. Some 270 g. of white polyethylene having an apparent density of 0.31 and a melt index of 7 were obtained.

Comparative Examples 1 to 5

Catalyst component (B) was prepared in the same manner as in the preparation of catalyst component (A) in Example 1 using the same magnesium carbonate as used in Example 1 but not using n-octanol. In the resulting catalyst component (B), titanium-chlorine compound equivalent to 6 mg. of titanium and 97 mg. of chlorine was supported per gram of the carrier.

Ethylene was polymerized under the same conditions as employed in Example 1 using 150 mg. of the catalyst component (B) and 3 mmols of triethyl aluminum (Comparative Example 1).

Ethylene was polymerized using 150 mg. of catalyst component (B), 0.75 mmol (equivalent to 0.5 mmol per gram of the catalyst component (B)) of n-octanol and 3 mmols of triethyl aluminum (Comparative Example 2).

Ethylene was polymerized using titanium tetrachloride and triethyl aluminum at the same Cl/Ti molar ratio as in Example 1 but using no magnesium carbonate as carrier (Comparative Example 3).

Ethylene was polymerized using titanium tetrachloride and triethyl aluminum in the presence of the carrier, the catalyst not being supported on the carrier in advance (Comparative Example 4).

Ethylene was polymerized using titanium tetrachloride and triethyl aluminum in the mere presence of the carrier and n-octanol of the same amounts as employed in Example 1 (Comparative Example 5).

The results obtained in these comparative examples are shown in Table 1 together with those of Example 1.

TABLE 1

| | Polyethylene | | | | |
| | Yield per gram of— | | | | |
| | Yield (g.) | The catalyst component [1] (g.) | Ti (g.) | Apparent density (g./cc.) | Melt index |
|---|---|---|---|---|---|
| Example 1 | 270 | 1,800 | 113 | 0.31 | 7.0 |
| Comparative Example: | | | | | |
| 1 | 107 | 310 | 118 | 0.24 | 0.40 |
| 2 | 1 | | | | |
| 3 | 14 | | 6 | | |
| 4 | 14 | | 6 | | |
| 5 | 7 | | 3 | | |

[1] Supported on the carrier.

Examples 2 to 13 and Comparative Example 6

The catalyst component supported on the carrier was prepared in the same manner as in Example 1 using varying amounts of n-octanol and titanium tetrachloride shown in Table 2. Ethylene was polymerized in the same manner as in Example 1 except that the amount of the carrier-supported catalyst component was varied. The results are given in Table 2.

In Comparative Example 6, the amount of n-octanol as electron donor was extremely small.

ed, and dried without decomposing the catalyst, for instance, with methanol.

TABLE 2

| | Amount of n-octanol used per gram of MgCO₃ (mmol) | Amount of TiCl₄ per gram of MgCO₃ (cc.) | Amounts of Ti and Cl per gram of the carrier | | Amount of the catalyst supported on the carrier (mg.) | Polyethylene | | | | |
|---|---|---|---|---|---|---|---|---|---|---|
| | | | Ti (mg.) | Cl (mg.) | | Yield (g.) | Yield per gram of the catalyst component supported on the carrier (g.) | Yield per milligram of Ti (g.) | Apparent density | Melt index |
| Control | 0 | 15 | 6 | 97 | 150 | 107 | 710 | 118 | 0.24 | 0.40 |
| Comparative Example: | | | | | | | | | | |
| 6 | 0.001 | 15 | 7 | 99 | 150 | 110 | 730 | 103 | 0.24 | 0.38 |
| 2 | 0.01 | 15 | 8 | 108 | 150 | 152 | 1,010 | 126 | 0.26 | 1.9 |
| 3 | 0.05 | 15 | 9 | 111 | 150 | 166 | 1,110 | 123 | 0.30 | 2.8 |
| 4 | 0.1 | 15 | 12 | 121 | 150 | 248 | 1,650 | 138 | 0.31 | 6.3 |
| 5 | 1 | 15 | 20 | 134 | 150 | 314 | 2,090 | 105 | 0.30 | 9.3 |
| 6 | 5 | 15 | 26 | 160 | 150 | 394 | 2,630 | 101 | 0.31 | 12.5 |
| 7 | 6 | 15 | 35 | 173 | 100 | 276 | 2,760 | 79 | 0.31 | 8.8 |
| 8 | 8 | 20 | 52 | 279 | 100 | 326 | 3,260 | 63 | 0.30 | 7.4 |
| 9 | 10 | 20 | 83 | 320 | 70 | 245 | 3,500 | 42 | 0.31 | 6.8 |
| 10 | 20 | 30 | 93 | 364 | 50 | 237 | 4,740 | 51 | 0.33 | 9.1 |
| 11 | 50 | 30 | 95 | 367 | 50 | 242 | 4,840 | 51 | 0.31 | 9.5 |
| 12 | 80 | 50 | 98 | 373 | 50 | 226 | 4,520 | 46 | 0.30 | 9.3 |
| 13 | 100 | 60 | 95 | 366 | 50 | 231 | 4,620 | 49 | 0.30 | 9.5 |

Examples 14 to 25 and Comparative Example 7

Anhydrous magnesium carbonate having an average particle diameter of 15μ and a specific surface area of 37 m.²/g. was dried for one hour at 150° C. The dried magnesium carbonate was suspended in refined hexane of an amount 5 cc. per gram of the magnesium carbonate, followed by addition of butyl acetate of the amount indicated in Table 3. The mixture was stirred for 30 minutes at 50° C. Hexane was removed in vacuo, and titanium tetrachloride of an amount indicated in Table 3 was Comparative Example 7 was conducted using an extremely small amount of butyl acetate as the electron donor.

Comparative Example 8

One hundred and fifty (150) milligrams of the catalyst component (B) prepared in Comparative Example 1 by reaction of titanium tetrachloride and magnesium carbonate not pre-treated with an electron donor were put into one liter of kerosene purged with nitrogen, and then 0.15 mmol, of butyl acetate was added so that the amount

TABLE 3

| | Amount of butyl acetate used per gram of MgCO₃ (mmol) | Amount of TiCl₄ per gram of MgCO₃ (cc.) | Amount of Ti and Cl per gram of the carrier | | Amount of the catalyst component supported on the carrier (mg.) | Polyethylene | | | | |
|---|---|---|---|---|---|---|---|---|---|---|
| | | | Ti (mg.) | Cl (mg.) | | Yield (g.) | Yield per gram of the catalyst component supported on the carrier (mg.) | Yield per milligram of Ti (g.) | Apparent density | Melt index |
| Comparative Example: | | | | | | | | | | |
| 7 | 0.001 | 15 | 7 | 90 | 150 | 108 | 720 | 103 | 0.24 | 0.44 |
| 14 | 0.01 | 15 | 8 | 110 | 150 | 150 | 1,000 | 125 | 0.26 | 1.3 |
| 15 | 0.05 | 15 | 8 | 102 | 150 | 164 | 1,090 | 136 | 0.29 | 2.7 |
| 16 | 0.1 | 15 | 13 | 121 | 150 | 261 | 1,740 | 134 | 1.29 | 6.5 |
| 17 | 0.5 | 15 | 15 | 136 | 150 | 288 | 1,920 | 128 | 0.30 | 6.4 |
| 18 | 1 | 15 | 21 | 151 | 150 | 318 | 2,120 | 101 | 0.31 | 12.3 |
| 19 | 5 | 15 | 30 | 170 | 100 | 299 | 2,990 | 100 | 0.32 | 8.4 |
| 20 | 6 | 15 | 64 | 295 | 100 | 362 | 3,620 | 57 | 0.30 | 10.5 |
| 21 | 8 | 20 | 88 | 328 | 50 | 200 | 4,000 | 45 | 0.31 | 8.6 |
| 22 | 10 | 20 | 110 | 376 | 50 | 247 | 4,920 | 45 | 0.31 | 9.2 |
| 23 | 20 | 20 | 125 | 433 | 50 | 251 | 5,020 | 40 | 0.30 | 9.3 |
| 24 | 30 | 20 | 135 | 466 | 50 | 233 | 4,660 | 35 | 0.31 | 8.9 |
| 25 | 40 | 30 | 130 | 462 | 50 | 238 | 4,760 | 37 | 0.31 | 9.0 | added. The entire system was stirred for one hour at 110° C., and a solid part was then separated by filtration while keeping the system warm. The separated solid part was washed with refined hexane repeatedly until there was no appreciable titanium tetrachloride in the filtrate. Subsequent drying of the solid part with an infrared radiator gave a catalyst component supported on the carrier.

A 2-liter autoclave was charged with one liter of refined kerosene, and after purging the autoclave sufficiently with nitrogen, 3 mmols of triisobutyl aluminum and the carrier-supported catalyst component of the amount indicated in Table 3 below were added. The entire system was heated to 90° C. Hydrogen (3.5 kg./cm.²) was introduced, and ethylene was continuously fed so that the total pressure reached 7 kg./cm.². The polymerization of ethylene was carried out for 2 hours. After the end of the polymerization, the solid part was separatof butyl acetate was the same as the amount of butyl acetate used in Example 18. Triethylaluminum (3 mmols) was added, and the system was heated to 90°. C. Hydrogen (3.5 kg./cm.²) was introduced, and ethylene was continuously fed so that the total pressure reached 7 kg./cm.². The polymerization of ethylene was conducted for 2 hours. Some 60 g. of polyethylene having a melt index of 0.40 were obtained.

Examples 26 and 27

A catalyst component supported on the carrier was prepared under the same conditions as in Example 18 except that the temperatures and times used in supporting titanium tetrachloride on magnesium carbonate pre-treated with butyl acetate were varied. Ethylene was polymerized under the same conditions as in Example 1 using 150 mg. of the carrier-supported catalyst component and 3 mmols of triethyl aluminum.

tained at 120° C. for one hour. After the end of the reaction, a solid part was separated by filtration, and washed thoroughly with hexane, followed by drying. Titanium-chlorine compound equivalent to 20 mg. of titanium and 142 mg. of chlorine was supported per gram of the carrier.

Ethylene was polymerized under the same conditions as in Example 1 using 150 mg. of this catalyst component

TABLE 4

| | Carrier-supporting reaction | | Amounts of Ti and Cl per gram of MgCO$_3$ | | | Yield (g.) | Polyethylene | | Melt index |
|---|---|---|---|---|---|---|---|---|---|
| | Temperature (° C.) | Time (hr.) | Ti (mg.) | Cl (mg.) | Cl/Ti | | Yield per gram of carrier-supported catalyst component (g.) | Yield per mg. of Ti (g.) | |
| Example: | | | | | | | | | |
| 26 | 30 | 3 | 18 | 59 | 4.4 | 187 | 1,250 | 44 | 5.8 |
| 27 | 40 | 3 | 21 | 155 | 10.0 | 309 | 2,060 | 98 | 8.9 |

Examples 28 to 75

Catalyst components supported on the carrier were prepared in the same manner as in Example 1 using various electron donors instead of n-octanol of Example 1. Ethylene was polymerized using the obtained catalyst components. The results are shown in Table 5.

TABLE 5

| | Amount of electron donor per gram of MgCO$_3$ (mmol) | Amount of Ti per gram of the carrier (mg.) | Polyethylene | | | Melt index |
|---|---|---|---|---|---|---|
| | | | Yield (g.) | Yield per gram of the catalyst component supported on the carrier (g.) | Yield per milligram of Ti (g.) | |
| Example: | Ethers: | | | | | |
| 28 | Dimethyl ether (1) | 21 | 251 | 1,610 | 80 | 13.1 |
| 29 | Hexyl ether (2) | 19 | 273 | 1,820 | 96 | 8.6 |
| 30 | Methyl undecyl ether (1) | 24 | 277 | 1,840 | 77 | 8.5 |
| 31 | Tetrahydrofuran (2) | 21 | 288 | 1,920 | 91 | 8.3 |
| 32 | Dioxane (2) | 19 | 260 | 1,730 | 91 | 9.8 |
| 33 | Trioxane (1.5) | 18 | 259 | 1,730 | 96 | 9.5 |
| | Ketones: | | | | | |
| 34 | Acetone (1) | 24 | 288 | 1,920 | 80 | 9.8 |
| 35 | Ethyl butyl ketone (0.5) | 18 | 271 | 1,810 | 101 | 8.8 |
| 36 | n-Butyl n-octyl ketone (0.5) | 20 | 253 | 1,690 | 84 | 8.6 |
| | Aldehydes: | | | | | |
| 37 | Formaldehyde (0.5) | 18 | 236 | 1,570 | 87 | 7.8 |
| 38 | Propionaldehyde (0.7) | 17 | 273 | 1,820 | 107 | 9.7 |
| 39 | Laurylaldehyde (1.0) | 21 | 259 | 1,730 | 82 | 8.7 |
| | Alcohols: | | | | | |
| 40 | Methanol (2) | 21 | 278 | 1,850 | 88 | 10.3 |
| 41 | Ethanol (1.5) | 21 | 321 | 2,140 | 102 | 8.4 |
| 42 | Lauryl alcohol (1) | 17 | 285 | 1,900 | 110 | 9.4 |
| | Amines: | | | | | |
| 43 | Methylamine (1) | 81 | 148 | 990 | 55 | 1.5 |
| 44 | Laurylamine (1) | 19 | 141 | 940 | 49 | 1.8 |
| 45 | Tributylamine (1) | 18 | 128 | 530 | 29 | 1.3 |
| 46 | Pyridine (0.5) | 21 | 134 | 930 | 44 | 2.4 |
| 47 | Aniline (1) | 18 | 135 | 900 | 50 | 1.6 |
| 48 | 7-ethyl naphthyl-2-amine (1) | 18 | 130 | 870 | 46 | 1.5 |
| 49 | Acetamide (0.5) | 18 | 218 | 1,450 | 81 | 6.2 |
| 50 | Formic amide (1) | 18 | 204 | 1,360 | 76 | 5.4 |
| 51 | Lauric amide (1) | 17 | 198 | 1,320 | 78 | 4.6 |
| | Nitriles: | | | | | |
| 52 | Acetonitrile (0.5) | 18 | 260 | 1,730 | 96 | 8.9 |
| 53 | Laurylonitrile (1) | 21 | 274 | 1,820 | 87 | 9.3 |
| 54 | Valeronitrile (1.5) | 22 | 371 | 2,110 | 96 | 8.5 |
| 55 | Acrylonitrile (1) | 16 | 283 | 1,890 | 118 | 9.7 |
| 56 | Benzonitrile (1) | 20 | 223 | 1,490 | 65 | 5.9 |
| 57 | 6-phenylcapronitrile (0.5) | 19 | 218 | 1,450 | 76 | 6.0 |
| | Phosphines: | | | | | |
| 58 | Trimethyl phosphine (0.5) | 23 | 158 | 1,050 | 46 | 2.4 |
| 59 | Triphenyl phosphine (1) | 27 | 163 | 1,090 | 40 | 1.4 |
| 60 | Phenyl phosphine (0.5) | 23 | 160 | 1,070 | 46 | 2.9 |
| 61 | Tritolyl phosphine (0.5) | 25 | 162 | 1,080 | 43 | 2.0 |
| | Carboxylic acids: | | | | | |
| 62 | Propionic acid (1.5) | 20 | 295 | 1,970 | 99 | 8.5 |
| 63 | Lauric acid (1) | 18 | 226 | 1,510 | 84 | 7.1 |
| 64 | Benzoic acid (1) | 16 | 241 | 1,610 | 100 | 8.1 |
| 65 | 6-phenyl hexanoic acid (0.5) | 14 | 196 | 1,310 | 93 | 6.5 |
| | Esters: | | | | | |
| 66 | Methyl acetate (1) | 20 | 298 | 1,990 | 100 | 9.4 |
| 67 | Dodecyl acetate (3) | 24 | 307 | 2,050 | 85 | 8.8 |
| 68 | Methyl tridecylate (0.5) | 18 | 296 | 1,970 | 110 | 8.6 |
| 69 | Dodecyl tridecylate (0.5) | 18 | 265 | 1,770 | 98 | 7.4 |
| 70 | Methyl acrylate (1) | 22 | 318 | 2,120 | 96 | 8.6 |
| 71 | Methyl benzoate (0.9) | 14 | 235 | 1,570 | 112 | 7.7 |
| 72 | Dodecyl benzoate (0.7) | 16 | 241 | 1,610 | 100 | 8.0 |
| 73 | Methyl 6-phenylhexoate (1) | 13 | 215 | 1,430 | 110 | 8.9 |
| 74 | Dodecyl 6-phenylhexoate (1.5) | 14 | 233 | 1,550 | 111 | 9.9 |
| 75 | Ethyl benzoate (0.2) | 14 | 238 | 1,590 | 106 | 6.5 |

Example 76

Ten grams of basic magnesium carbonate were suspended in hexane, and 10 mmols of octyl laurate were added. The mixture was stirred for 30 minutes at 50° C., and hexane was removed in vacuo. Titanium tetrachloride (150 cc.) was added, and the entire system was maintained and 3 mmols of triisobutyl aluminum. Some 300 g. of polyethylene having a melt index of 8.6 and an apparent density of 0.30 were obtained.

The yield of polyethylene per gram of the catalyst component supported on the carrier was 2000 g., and that per mg. of titanium was 100 g.

Comparative Example 9

Basic magnesium carbonate was reacted with titanium tetrachloride under the same conditions as in Example 76 except that octyl laurate was not used. Titanium-chlorine compound equivalent to about 12 mg. of titanium was supported per gram of the carrier.

Ethylene was polymerized under the same conditions as in Example 1 using 150 mg. of this catalyst component and 3 mmols of triisobutyl aluminum. Some 140 g. of polyethylene having a melt index of 2.8 were obtained. The yield of polyethylene was 930 g. per gram of the carrier, and 78 g. per milligram of titanium.

Example 77

A catalyst component was prepared under the same conditions as in Example 76 except that one mmol of methyl undecyl ether was used instead of octyl laurate of Example 76. Titanium-chlorine compound equivalent to 23 mg. of titanium was supported per gram of the carrier.

Ethylene was polymerized under the same conditions as in Example 1 using 150 mg. of the obtained catalyst component and 3 mmols of triisobutyl aluminum. Some 296 g. of polyethylene having a melt index of 7.8 and an apparent density of 0.30 were obtained.

Comparative Examples 10 to 21

These examples were conducted with a view to examining the effect of electron donors used to pre-treat various inorganic solid particles.

Catalyst components were prepared in the same manner as in the preparation of catalyst component A in Example 1 in the presence of an electron donor, or in the same manner as in the preparation of catalyst component B in Comparative Example 1 in the absence of an electron donor. The polymerization of ethylene was performed under the same conditions as in Example 1. The results are given in Table 6.

Examples 78 to 82 and Comparative Examples 22 and 23

The same dried anhydrous magnesium carbonate as used in Example 1 was suspended into refined hexane, and the electron donor indicated in Table 7 was added. The mixture was stirred for one hour at 50° C. Hexane was removed in vacuo. The transition metal halogen compound indicated in Table 7 in an amount of 100 cc. per gram of the carrier was added, and the entire system was heated for one hour at 135° C. After the end of the reaction, a solid part was separated by filtration, and free transition metal halogen compound was removed by washing with hexane.

A 2-liter autoclave was charged with one liter of refined kerosene, and after purging with nitrogen, 3 mmols of triethylaluminum and 150 mg. of the catalyst component supported on the carrier were added. The system was heated to 90° C., and 3.5 kg./cm.$^2$ of hydrogen were introduced. Ethylene was continuously fed so that the total pressure of the system was 7 kg./cm.$^2$. The polymerization of ethylene was effected for 2 hours. The results obtained are given in Table 7.

TABLE 7

| | | | | Polyethylene | | |
|---|---|---|---|---|---|---|
| | Transition metal halogen compound | Amount of electron donor per gram of the carrier (mmol.) | Amount of the transition metal per gram of the carrier (mg.) | Yield (g.) | Yield per gram of the catalyst component supported on the carrier (g.) | Yield per milligram of Ti (g.) | Melt index |
| Example: | | | | | | | |
| 78 | (n-BuO)$_2$TiCl$_2$ | Butyl acetate (1) | 20 | 198 | 1,320 | 66 | 4.7 |
| 79 | TiBr$_4$ | do | 19 | 278 | 1,850 | 97 | 8.9 |
| 80 | (EtO)TiCl$_3$ | do | 22 | 229 | 1,530 | 70 | 7.8 |
| 81 | VCl$_4$ | Butyl acetate (0.5) | 12 | 98 | 650 | 54 | 0.13 |
| Comparative Example 22 | VCl$_4$ | | 8 | 52 | 350 | 44 | 0.25 |
| 82 | VOCl$_3$ | n-Octanol (0.5) | 12 | 94 | 630 | 53 | 1.31 |
| Comparative Example 23 | VOCl$_3$ | | 8 | 36 | 240 | 30 | 0.20 |

Examples 83 to 89

Ethylene was polymerized under the same conditions as employed in Example 1 using 3 mmols each of various aluminum or zinc compounds described in Table 8 instead of the triethyl aluminum used in Example 1.

TABLE 8

| | | | Polyethylene | |
|---|---|---|---|---|
| | Organo-metallic compounds | Yield (g.) | Yield per gram of the catalyst component supported on the carrier (g.) | Yield per milligram of Ti (g.) |
| Example: | | | | |
| 83 | (C$_2$H$_5$)AlCl$_2$ | 110 | 734 | 46 |
| 84 | (C$_2$H$_5$)$_2$AlCl | 144 | 960 | 60 |
| 85 | (C$_2$H$_5$)$_2$AlBr | 136 | 906 | 57 |
| 86 | (C$_2$H$_5$)$_2$AlOC$_2$H$_5$ | 106 | 707 | 44 |
| 87 | (C$_2$H$_5$)$_2$Al(OC$_2$H$_5$)Cl | 110 | 734 | 46 |
| 88 | (C$_2$H$_5$)$_2$Zn | 142 | 946 | 59 |
| 89 | (C$_2$H$_5$)$_{1.5}$AlCl$_{1.5}$ | 113 | 754 | 47 |

TABLE 6

| | Carrier | Amount of electron donor per gram of the carrier (mmol) | Amount of Ti per gram of the carrier (mg.) | Yield (g.) | Yield per gram of the catalyst component supported on the carrier (g.) | Yield per milligram of Ti (g.) | Apparent density | Melt index |
|---|---|---|---|---|---|---|---|---|
| Comparative Example: | | | | | | | | |
| 10 | MgSO$_4$ | Butylacetate (0) | 0.3 | 5 | 33 | 110 | | |
| 11 | MgSO$_4$ | Butylacetate (1) | 0.2 | 3 | 20 | 100 | | |
| 12 | Mg(OCOCH$_3$)$_2$ | n-Octanol (0) | 6 | 64 | 430 | 72 | 0.10 | 2 |
| 13 | Mg(OCOCH$_3$)$_2$ | n-Octanol (3) | 15 | 38 | 250 | 17 | 0.12 | 1.8 |
| 14 | MgO | Octylbutyrate (0) | 8 | 131 | 870 | 109 | 0.12 | 3.1 |
| 15 | MgO | Octylbutyrate (3) | 9 | 133 | 890 | 99 | 0.11 | 2.9 |
| 16 | SiO$_2$ | Pyridine (0) | 61 | 68 | 450 | 7 | 0.18 | 2.2 |
| 17 | SiO$_2$ | Pyridine (1) | 87 | 71 | 470 | 5 | 0.21 | 1.4 |
| 18 | CaCO$_3$ | Butylethylketone (0) | 8 | 10 | 67 | 8 | 0.10 | 0.8$_1$ |
| 19 | CaCO$_3$ | Butylethylketone (5) | 18 | 14 | 93 | 5 | 0.10 | 0.7$_5$ |
| 20 | CaO | Acetonitrile (0) | 48 | 45 | 300 | 6 | 0.08 | 0.3$_3$ |
| 21 | CaO | Acetonitrile (5) | 46 | 42 | 280 | 6 | 0.08 | 0.3$_4$ |

Example 90

A 2-liter autoclave was charged with 500 cc. of refined hexane, and then with 3 mmols of triisobutyl aluminum and 300 mg. of the catalyst component supported on the carrier which had been prepared in Example 1. The mixture was aged for 20 minutes at 50° C. Propylene (200 g.) was fed, and polymerized for 3 hours at 50° C. Unreacted propylene was removed by reducing the pressure, and the reaction mixture was put into methanol. The resulting solid polymer was recovered by filtration, and dried in vacuo. Some 121 g. of polypropylene were obtained. The boiling heptane extraction residue was 31%. The yield of polypropylene corresponds to 404 g. per gram of the catalyst component supported on the carrier, and 25.2 g. per milligram of titanium.

Example 91

A gaseous mixture of ethylene and propylene containing 1.5 mol percent of propylene was polymerized in the same manner as in Example 1 using 150 mg. of the catalyst component prepared in Example 1, 3 mmols of triethyl aluminum and one liter of kerosene with the introduction of hydrogen to a partial pressure of 1.5 kg./cm.$^2$. The pressure in the autoclave was maintained at 5 kg./cm.$^2$ during the polymerization. Some 220 g. of an ethylene/propylene copolymer containing four methyl groups per 1000 carbon atoms and having a melt index of 4 were obtained.

The yield of the copolymer corresponds to 1470 g. per gram of the catalyst component supported on the carrier, and 98 g. per milligram of titanium.

Example 92

A gaseous mixture of ethylene and 1-butene containing 0.8 mol percent of 1-butene was polymerized in the same manner as in Example 91. Some 204 g. of an ethylene/1-butene copolymer having a melt index of 5.5 and three ethyl groups per 1000 carbon atoms were obtained. The yield of the copolymer corresponded to 1360 g. per gram of the catalyst component supported on the carrier and 90.5 g. per milligram of titanium.

Example 93

Three grams of the same magnesium carbonate used in Example 1 were suspended in 45 cc. of titanium tetrachloride, and 0.2 mmol of n-octanol was immediately added to the suspension. After heating the suspension to 60° C., the reaction was conducted for 2 hours. A solid part was washed thoroughly with hexane. Titanium-chlorine compound equivalent to 11 mg. of titanium and 107 mg. of chlorine was supported per gram of the carrier. Ethylene was polymerized in the same manner as in Example 1 using 150 mg. of the catalyst component thus obtained and 3 mmols of triethyl aluminum. Some 198 g. of polyethylene were obtained. The yield of polyethylene corresponded to 1320 g. per gram of the catalyst component supported on the carrier, and 120 g. per milligram of titanium.

Example 94

The same magnesium carbonate used in Example 14 was put into 45 cc. of titanium tetrachloride, followed by addition of 3 mmols of ethyl acetate. The mixture was heated to 60° C., and the reaction was performed for one hour under stirring. After the end of the reaction, a solid part was separated by filtration, washed with hexane and dried. Titanium-chlorine compound equivalent to 20 mg. of titanium was supported per gram of the solid.

Ethylene was polymerized in the same manner as in Example 14 using 150 mg. of the so obtained catalyst component supported on the carrier and 3 mmols of triethyl aluminum. Some 280 g. of polyethylene having an apparent density of 0.3 and a melt index of 7.4 were obtained. The yield of polyethylene corresponded to 1870 g. per gram of the catalyst component supported on the carrier and 94 g. per milligram of titanium.

Example 95

Methyl acetate (0.2 mmol) was added to 45 cc. of titanium tetrachloride and the mixture was stirred for 5 minutes, followed by addition of 3 g. of magnesium carbonate. A catalyst component supported on the carrier was prepared in the same manner as in Example 93. Titanium-chlorine compound equivalent to 11 mg. of titanium and 110 mg. of chlorine was supported per gram of the catalyst component obtained.

Ethylene was polymerized in the same manner as in Example 93 using 150 mg. of the catalyst component and 3 mmols of triethyl aluminum. Some 200 g. of polyethylene were obtained. The yield of polyethylene corresponded to 1330 g. per gram of the catalyst component and 121 g. per milligram of titanium.

Example 96

Three mmols of ethyl laurate were added to 45 cc. of titanium tetrachloride, and 3 g. of the same basic magnesium carbonate used in Example 76 were added. A catalyst component supported on the carrier was prepared in the same manner as in Example 93. Titanium-chlorine compound equivalent to 22 mg. of titanium was supported per gram of the catalyst component obtained.

Ethylene was polymerized in the same manner as in Example 93 using 150 mg. of the catalyst component and 3 mmols of triethyl aluminium. Some 268 g. of polyethylene having an apparent density of 0.3 and a melt index of 7.5. The yield of polyethylene corresponded to 1790 g. per gram of the catalyst component supported on the carrier, and 81 g. per milligram of titanium.

What is claimed is:

1. A process for polymerizing or copolymerizing olefins in the presence of a catalyst comprising a transition metal component of the Ziegler-type catalyst chemically bound and supported on inorganic solid particles, which comprises polymerizing or copolymerizing olefins in the presence of an inert polymerization solvent and a catalyst consisting essentially of
    (a) a transition metal component chemically bound and supported on the surface of inorganic solid particles, obtained by treating solid particles of magnesium carbonate with an electron donor selected from the group consisting of aliphatic carboxylic acids, aromatic carboxylic acids, esters of aliphatic carboxylic acids and aliphatic alcohols, esters of aromatic carboxylic acids and aliphatic alcohols, aliphatic ethers, cyclic ethers, aliphatic ketones, aromatic ketones, aliphatic aldehydes, aliphatic alcohols, aromatic alcohols, aliphatic acid amides, aliphatic nitriles, aromatice nitriles, aliphatic amines, aromatic amines, aliphatic phosphines and aromatic phosphines which is liquid or gaseous under the treating conditions, the amount of said electron donor being at least 0.01 mmol per gram of the solid particles of magnesium carbonate, and a liquid transition metal compound which is selected from the group consisting of halogen compounds of titanium and vanadium, the amount of said transition metal compound being 0.1–3 mmols per gram of said solid particles of magnesium carbonate, the preparation of said transition metal component being carried out by treating said solid particles or magnesium carbonate with said electron donor and thereafter with said transition metal compound or by treating said solid particles of magnesium carbonate with said electron donor in the co-presence of said transition metal compound; and,
    (b) an organo-metallic compound selected from the group consisting of organo-aluminum compounds and alkyl zinc, said organo-metallic compound being present in an amount of 0.01–50 mmols per liter of said polymerization solvent.

2. The process of claim 1 wherein said electron donor is a compound selected from the group consisting of aliphatic carboxylic acids having 1 to 12 carbon atoms, aromatic carboxylic acids having 7 to 12 carbon atoms, esters of aliphatic carboxylic acids having 1 to 12 carbon atoms and saturated or unsaturated aliphatic alcohols having 1 to 12 carbon atoms, esters of aromatic carboxylic acids having 7 to 12 carbon atoms and aliphatic alcohols having 1 to 12 carbon atoms, aliphatic ethers having 2 to 12 carbon atoms, cyclic ethers having 3 to 4 carbon atoms, aliphatic ketones having 3 to 13 carbon atoms, aliphatic aldehydes having 1 to 12 carbon atoms, aliphatic alcohols having 1 to 12 carbon atoms, said aliphatic amides having 1 to 12 carbon atoms, aliphatic nitriles having 2 to 12 carbon atoms, aromatic nitriles having 7 to 12 carbon atoms, aliphatic amines having 1 to 12 carbon atoms, aromatic amines having 6 to 10 carbon atoms, aliphatic phosphines having 3 to 18 carbon atoms and aromatic phosphines having 6 to 21 carbon atoms.

3. The process of claim 2 wherein said electron donor is selected from the group consisting of $C_1$–$C_{12}$ saturated or unsaturated aliphatic alcohols, aliphatic carboxylic acids having 1 to 12 carbon atoms and aromatic carboxylic acids having 7 to 12 carbon atoms, and said magnesium carbonate solid particles are first treated with said electron donor and then with said transition metal compound.

4. The process of claim 1 wherein the amount of said transition metal component chemically bound and supported onto the surface of said solid particles of magnesium carbonate is 0.005 to 10 g. per liter of said polymerization solvent and the amount of said organometallic compound is 0.01 to 50 mmols per liter of said polymerization solvent.

5. The process of claim 4 wherein the average particle diameter of said solid particles is 0.1 to 30 microns, and at least 80% by weight of said solid particles have a particle diameter of 0.1 to 30 microns.

6. The process of claim 1 wherein said solid particles of magnesium carbonate have an average particle diameter of 0.05 to 70 microns.

7. The process of claim 1 wherein the treatment with the electron donor is carried out at a temperature of from room temperature to 300° C.

8. The process of claim 1 wherein said treatment with said transition metal compound is effected in the absence of oxygen and water at a temperature of from room temperature to 300° C.

9. The process of claim 1 wherein said treatment with said transition metal compound is carried out in the absence of a liquid organic solvent.

References Cited

UNITED STATES PATENTS

| | | | |
|---|---|---|---|
| 2,881,156 | 4/1959 | Pilar et al. | 260—94.9 |
| 2,932,633 | 4/1960 | Juveland et al. | 260—94.9 |
| 2,965,626 | 12/1960 | Pilar et al. | 260—94.9 |
| 2,965,627 | 12/1960 | Field et al. | 260—94.9 |
| 3,238,146 | 3/1966 | Hewitt et al. | 252—441 |

FOREIGN PATENTS

| | | |
|---|---|---|
| 841,822 | 7/1960 | Great Britain. |
| 6714024 | 4/1968 | Netherlands. |
| 1,560,467 | 2/1969 | France. |

JOSEPH L. SCHOFER, Primary Examiner

F. J. SMITH, Assistant Examiner

U.S. Cl. X.R.

252—429 B, 429 C; 260—93.7, 94.9

UNITED STATES PATENT OFFICE
CERTIFICATE OF CORRECTION

S-436

Patent No. 3,647,772          Dated March 7, 1972

Inventor(s) Kashiwa, Norio

It is certified that error appears in the above-identified patent and that said Letters Patent are hereby corrected as shown below:

Page 5, in Table 2, the 4th heading, after "catalyst", insert -- component --.

Page 5, in Table 3, the 4th entry under the heading "Apparent density", delete "1.29" and insert -- 0.29 --.

Page 6, in Table 5, Example 51 under the heading "Melt Index", delete "4.6" and insert -- 4.9 --.

Page 6, in Table 5, Example 54 under the heading "Yield (g.)", delete "371" and insert -- 317 --.

Page 6, in Table 5, Example 74 under the heading "Melt index", delete "9.9" and insert -- 9.5 --.

Page 6, in Table 5, Example 75 under the heading "Melt index", delete "6.5" and insert -- 6.6 --.

Page 8, Claim 1 (a), line 60, delete "or" and insert -- of --.

Page 8, Claim 2, line 7 in column 17, delete "said".

Signed and sealed this 11th day of July 1972.

(SEAL)
Attest:

EDWARD M. FLETCHER, JR.
Attesting Officer

ROBERT GOTTSCHALK
Commissioner of Patents